(12) United States Patent
Detlefs et al.

(10) Patent No.: US 8,839,213 B2
(45) Date of Patent: Sep. 16, 2014

(54) OPTIMIZING PRIMITIVES IN SOFTWARE TRANSACTIONAL MEMORY

(75) Inventors: David L. Detlefs, Issaquah, WA (US); Michael M. Magruder, Carnation, WA (US); Yosseff Levanoni, Redmond, WA (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1357 days.

(21) Appl. No.: 12/163,284

(22) Filed: Jun. 27, 2008

(65) Prior Publication Data

US 2009/0328018 A1 Dec. 31, 2009

(51) Int. Cl.
G06F 9/45 (2006.01)

(52) U.S. Cl.
CPC ........................................ *G06F 8/443* (2013.01)
USPC ............................ 717/149; 717/152; 717/155

(58) Field of Classification Search
None
See application file for complete search history.

(56) References Cited

U.S. PATENT DOCUMENTS

| | | | | |
|---|---|---|---|---|
| 5,603,011 | A * | 2/1997 | Piazza | 711/170 |
| 7,747,996 | B1 * | 6/2010 | Dice | 710/200 |
| 8,601,456 | B2 * | 12/2013 | Duffy et al. | 717/154 |
| 2006/0173885 | A1 * | 8/2006 | Moir et al. | 707/101 |
| 2007/0028056 | A1 | 2/2007 | Harris | |
| 2007/0136290 | A1 | 6/2007 | Shinnar et al. | |
| 2007/0156780 | A1 | 7/2007 | Saha et al. | |
| 2007/0169030 | A1 | 7/2007 | Tarditi, Jr. et al. | |
| 2008/0034359 | A1 * | 2/2008 | Duffy et al. | 717/152 |
| 2009/0319753 | A1 * | 12/2009 | Welc et al. | 711/200 |

OTHER PUBLICATIONS

Minh, et al., "An Effective Hybrid Transactional Memory System with Strong Isolation Guarantees", 2007, p. 69-70.
Saha, et al., "Architectural Support for Software Transactional Memory", 2006, 12 pages.
David Eisenstat, "Two Interfaces to the RSTM Transactional Memory System", May 9, 2006, 12 pages.
Hindman, et al., "Atomicity via Source-to-Source Translation", 2006, 10 pages.
Shpeisman, et al, "Enforcing Isolation and Ordering in STM", Jun. 2007, p. 78-88.
Hudson, et al., "McRT-Malloc—A Scalable Transactional Memory Allocator", 2006, p. 74-83.
Adl-Tabatabai, et al., "Compiler and Runtime Support for Efficient Software Transactional Memory", PLDI'06 Jun. 10-16, 2006, Ottawa, Ontario, Canada, pp. 26-37.
Wang, e tal., "Code Generation and Optimization for Transactional Memory Constructs in an Unmanaged Language", International Symposium on Code Generation and Optimization (CGO'07), Year of Publication: 2007, 12 pages.
Harris, et al., "Optimizing Memory Transactions", PLDI'06 Jun. 11-14, 2006, Ottawa, Ontario, Canada, Year of Publication: 2006, pp. 14-25.

* cited by examiner

*Primary Examiner* — Don Wong
*Assistant Examiner* — Erika Kretzmer
(74) *Attorney, Agent, or Firm* — Kevin Sullivan; Brian Haslam; Micky Minhas

(57) ABSTRACT

A compiler is provided that determines when the use of software transactional memory (STM) primitives may be optimized with respect to a set of collectively dominating STM primitives. The compiler analysis coordinates the use of variables containing possible shadow copy pointers to allow the analysis to be performed for both direct write and buffered write STM systems. The coordination of the variables containing the possible shadow copy pointers ensures that the results of STM primitives are properly reused. The compiler analysis identifies memory accesses where STM primitives may be eliminated, combined, or substituted for lower overhead STM primitives.

20 Claims, 5 Drawing Sheets

OPTIMIZING PRIMITIVES IN SOFTWARE TRANSACTIONAL MEMORY

BACKGROUND

Computer programs may be written to allow different portions (e.g., threads) of the program to be executed concurrently. In order to execute different portions of the program concurrently, the computer system or the program typically includes some mechanism to manage the memory accesses of the different portions to ensure that the parts access common memory locations in the desired order.

Transactional memory systems allow programmers to designate transactions in a program that may be executed as if the transactions are executing in isolation (i.e., independently of other transactions and other sequences of instructions in the program). Transactional memory systems manage the memory accesses of transactions by executing the transactions in such a way that the effects of the transaction may be rolled back or undone if two or more transactions attempt to access the same memory location in a conflicting manner. Transaction memory systems may be implemented using hardware and/or software components.

By tracking each memory access, however, transaction memory systems may add overhead to the execution of programs. If memory accesses to the same data are identified, transaction memory systems may be able to reduce the amount of overhead used to track the memory accesses. Unfortunately, accesses to the same data may be spaced out through a program and may use different variable names for the same data. In addition, the effect of instructions on the program between accesses to the same data may be difficult to discern.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A compiler is provided that determines when the use of software transactional memory (STM) primitives may be optimized with respect to a set of collectively dominating STM primitives. The compiler analysis coordinates the use of variables containing possible shadow copy pointers to allow the analysis to be performed for both direct write and buffered write STM systems. The coordination of the variables containing the possible shadow copy pointers ensures that the results of STM primitives are properly reused. The compiler analysis identifies memory accesses where STM primitives may be eliminated, combined, or substituted for lower overhead STM primitives.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
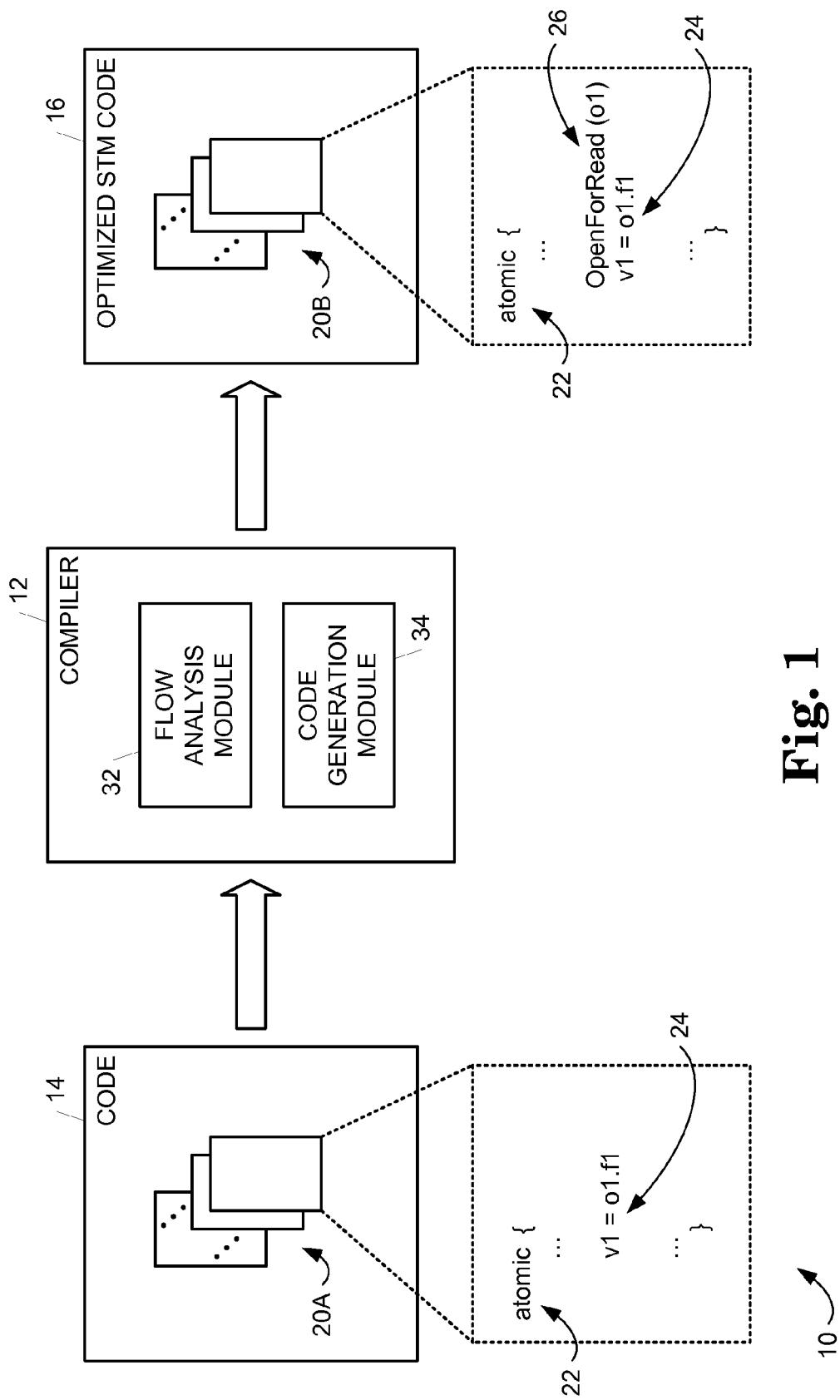
FIG. 1 is a block diagram illustrating an embodiment of a compiler system with a compiler that is configured to compile source code with software transactional memory transactions.

FIG. 1 is a block diagram illustrating an embodiment of a compiler system 10 with a compiler 12 that is configured to compile code 14 that includes software transactional memory (STM) transactions 20A.

Compiler system 10 represents a compile mode of operation in a computer system, such as computer system 100 shown in FIG. 7 and described in additional detail below, where the computer system is executing instructions to compile code 14 into optimized STM code 16. In one embodiment, compiler system 10 includes a just-in-time (JIT) compiler system that operates in computer system 10 in conjunction with a runtime environment executed by an operating system (OS), such as OS 122 shown in FIG. 7 and described in additional detail below, an STM library, such as STM library shown in FIGS. 2A and 8 and described in additional detail below, and any additional runtime libraries (not shown). In another embodiment, compiler system 10 includes a stand-alone compiler system that produces optimized STM code 16 for execution on the same or a different computer system.

Code 14 includes a set of one or more STM transactions 20A. Each STM transaction 20A includes a transaction designator 22 that indicates to compiler 12 that a corresponding portion of code 14 is an STM transaction 20A. Each STM transaction 20A may include zero or more memory accesses 24 that read from and/or write to a memory location. Each transaction 20A includes a sequence of instructions that is designed to execute atomically, i.e., as if the sequence is executing in isolation from other code in code 14. Accordingly, each transaction 20A forms an atomic block of code 14.

Code 14 may be any suitable source code written in a language such as Java or C# or any suitable bytecode such as Common Intermediate Language (CIL), Microsoft Intermediate Language (MSIL), or Java bytecode.

Compiler 12 accesses or otherwise receives code 14 and transforms code 14 into optimized STM code 16 for execution by a computer system. Compiler 12 performs any desired conversion of the set of instructions of code 14 into a set of instructions that are executable by a designated computer system and includes the set of instructions in optimized STM code 16.

Compiler 12 also identifies transactions 20A in code 14 from transaction designators 22 and modifies transactions 20A into transactions 20B in optimized STM code 16 that include invocations of STM primitives 26. STM primitives 26 are designed to operate in conjunction with an STM system, such as an STM system 40 shown in FIG. 2A and described in additional detail below. Each STM primitive 26 invokes a function in an STM library, such as STM library 42 shown in FIG. 2A. STM primitives 26 include STM primitives that manage the execution of each transaction 20B (e.g., STM primitives that start, abort, commit, and retry transactions 20B). STM primitives 26 also include STM primitives that manage the memory accesses of each transaction 20B (e.g., STM primitives that open memory locations of transactions 20B for reading and/or writing). Compiler 12 generates transactions 20B in optimized STM code 16 to include appropriate invocations of STM primitives 26.

Compiler 12 includes a flow analysis module 32 and a code generation module 34. Flow analysis module 32 performs a program flow analysis of code 14 to identify opportunities for optimizing the use of STM primitives in optimized STM code 16. In particular, flow analysis module 32 attempts to identify instances where the results of STM primitives 26 may be reused either as is or by other STM primitives 26 to reduce the overhead caused by STM primitives 26 in executing optimized STM code 16. Flow analysis module 32 includes instructions configured to perform value numbering and an open state analysis on code 14 to identify the STM optimizations.

The STM optimizations may include the omission of redundant STM primitives 26 (e.g., STM primitives that open the same memory location for reading or writing). The STM optimizations may also include the combining of several invocations of STM primitives 26 into an invocation of a single STM primitive 26 that performs the collective functions of the combined STM primitives 26 (e.g., an STM memory access primitive that opens a memory location for writing and reading combines the functions of separate STM primitives 26 that open the memory location for writing and open the memory location for reading). The STM optimizations may further substitute lower overhead STM primitives 26 for other STM primitives (e.g., an STM memory access primitive that re-opens a memory location for reading may be substituted for an STM primitive 26 that opens the memory location for reading).

Code generation module 34 generates optimized STM code 16 from code 14. Code generation module 34 generates optimized STM code 16 to include a set of instructions that are executable by a designated computer system and includes STM primitives 26 in transactions 20B to allow optimized STM code 16 to execute in an STM system. Code generation module 34 uses the results of the program flow analysis generated by flow analysis module 32 to optimize the use of STM primitives 26 in optimized STM code 16 as will be described in additional detail below.

Figure 2A:
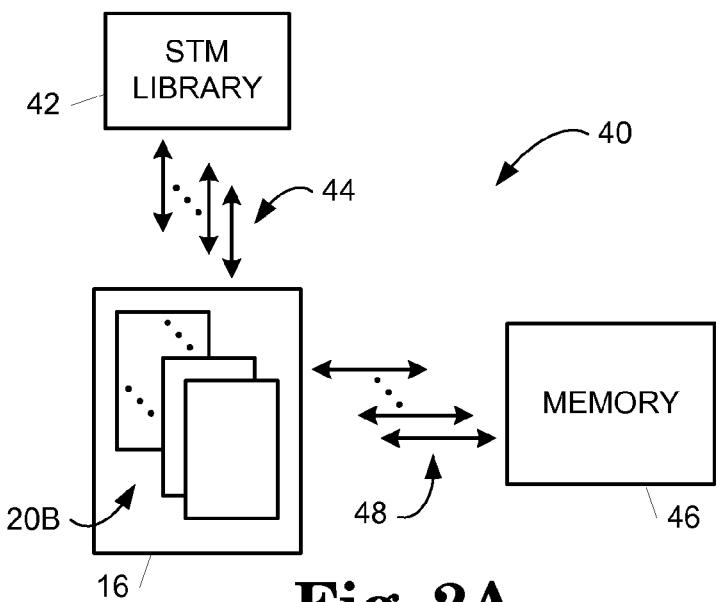
FIGS. 2A-2C are block diagrams illustrating a software transactional memory system.
Figure 2B:
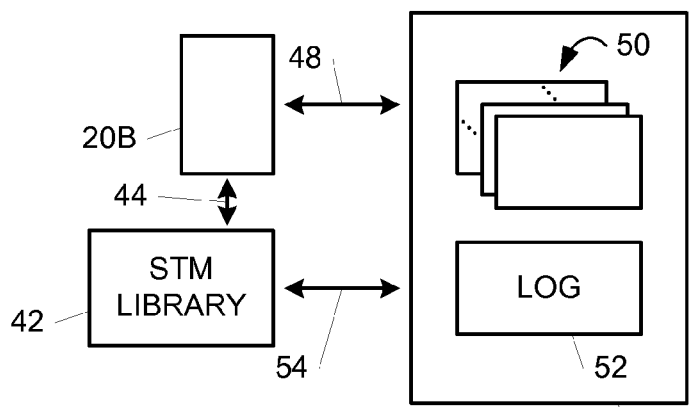
Figure 2C:
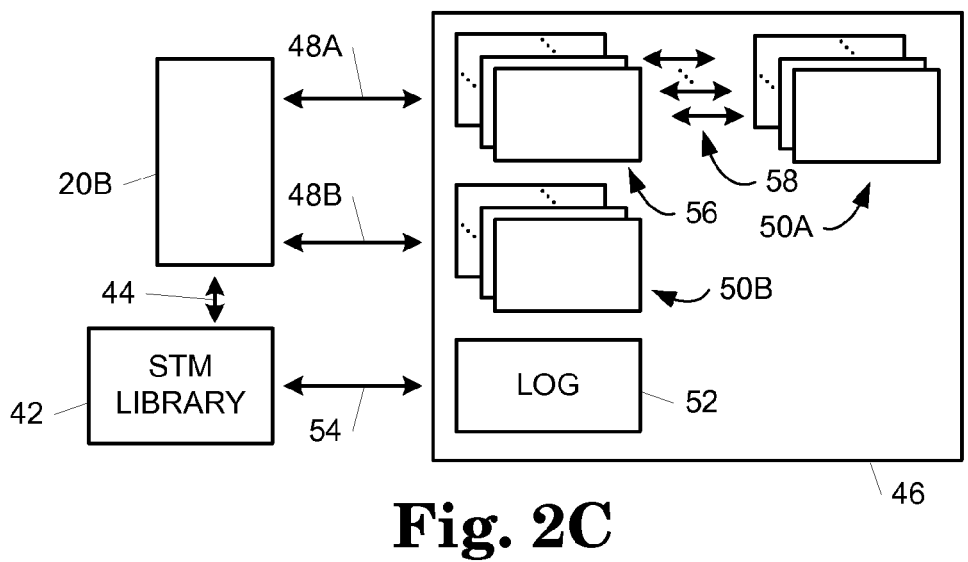

FIGS. 2A-2C are block diagrams illustrating an STM system 40 that executes optimized STM code 16. STM system 40 includes STM code 16 with STM transactions 20B, an STM library 42, and a memory system 46.

STM system 40 is configured to manage the execution of STM transactions 20B in STM code 16 to allow STM transactions 20B to be executed atomically and, if desired, rollback or undo changes made by STM transactions 20B. As described above, STM transactions 20B include STM primitives 26 that call functions in STM library 42 and the functions of STM library 42 return results to STM transactions 20B as indicated by function calls and returns 44. STM system 40 tracks memory accesses by STM transactions 20B in response to STM primitives 26.

STM primitives 26 of each STM transaction 20B include management primitives that call start, commit, abort, and retry functions in STM library 42. An STM transaction 20B calls the start function to initiate the management of the STM transaction 20B by STM library 42. An STM transaction 20B calls the commit function to finalize the results of the transaction in memory system 46, if successful. An STM transaction 20B calls the abort function to roll back or undo the results of the transaction in memory system 46. An STM transaction 20B calls the retry function to retry the transaction.

STM primitives 26 of each STM transaction 20B also include memory access primitives that lock memory locations for reading and/or writing. Prior to an STM transaction 20B accessing a memory location in a memory system 46 as indicated by memory accesses 48, STM transaction 20B issues a function call to open the memory location and thereby obtains a lock to the memory location. As described below with reference to the STM memory access primitives, a memory location may be opened for reading, opened for writing, opened for writing and reading, reopened for reading after reading, and reopened for reading after writing.

In one embodiment, each STM memory access primitive operates to lock memory locations that include an object or static block in memory system 46. In other embodiments, each STM memory access primitive operates to lock other sizes or granularities of memory system 46.

In one embodiment, STM library 42 is configured to operate in two modes of operation: a direct write mode of operation and a buffered write mode of operation. In other embodiments, STM library 42 may be configured to operate in only a direct write mode of operation or only a buffered write mode of operation.

The direct write mode of operation is illustrated with reference to FIG. 2B. In the direct write mode of operation, STM library 42 causes memory accesses 48 by each STM transaction 20B to be made directly to memory locations 50 in memory system 46. Each write access 48 executed by STM transaction 20B writes directly to a memory location 50 indicated by the write access. Each read access 48 executed by STM transaction 20B reads directly from a memory location 50 indicated by the read access. STM library 42 adds each write and read access 48 from transaction 20B to a log 52 as indicated by an arrow 54 and uses log 52 to roll back STM transaction 20B in response to STM transaction 20B being aborted.

The buffered write mode of operation is illustrated with reference to FIG. 2C. In the buffered write mode of operation, STM library 42 causes memory write accesses 48A by each STM transaction 20B to be made to shadow copies 56 of memory locations 50A in memory system 46. STM library 42 causes memory read accesses 48A that occur after a designated memory location 50A has been opened from writing by each STM transaction 20B to be made from shadow copies 56 of memory locations 50A in memory system 46. STM library 42 causes memory read accesses 48A that occur before a designated memory location 50B has been opened from writing by each STM transaction 20B to be made directly from memory locations 50B in memory system 46.

Each write access 48A executed by STM transaction 20B writes directly to a shadow copy 56 indicated by the write access. STM library 42 creates a shadow copy 56 in response to the first write access 48A of each memory location 50A as indicated by arrows 58. As described in additional detail below, subsequent write accesses 48A to the same memory location 50A from STM transaction 20B or nested transactions in STM transaction 20B write to the shadow copy 56 created in response to the first write access. Each read access 48A executed by STM transaction 20B that occur after a designated memory location 50A has been opened for writing reads from the shadow copy 56 indicated by the read access. Each read access 48B executed by STM transaction 20B that occur before a designated memory location 50B has been opened from writing reads directly from the memory location 50B indicated by the read access.

STM library 42 adds each write and read access 48A and each read access 48B from transaction 20B to log 52 as indicated by an arrow 54 and uses log 52 to roll back STM transaction 20B in response to STM transaction 20B being aborted. STM library 42 causes shadow copies 56 to be stored into memory locations 50A in response to transaction 20B committing successfully.

Memory system 46 includes any suitable type, number, and configuration of volatile or non-volatile storage devices configured to store instructions and data. The storage devices of memory system 46 represent computer readable storage media that store computer-executable instructions including STM code 16 and STM library 42. The instructions are executable by the computer system to perform the functions and methods of STM code 16 and STM library 42 herein. Examples of storage devices in memory system 46 include hard disk drives, random access memory (RAM), read only memory (ROM), flash memory drives and cards, and magnetic and optical disks.

In both the direct write and buffered write modes of operation, compiler 12 seeks to optimize STM code 16 by eliminating redundant STM primitives 26, combining STM primitives 26, or substituting lower overhead STM primitives. In the buffered write modes of operation, calls to STM library 42 that lock a memory location 50 for reading and/or writing return the address that is used to represent memory location 50. The write-lock library call returns a pointer to a shadow copy 56. The read-lock library call, however, returns a pointer to either the original memory location 50 or to a shadow copy 56 depending on whether the memory location 50 had been previously write-locked by the current transaction 20B. If an STM primitive 26 is eliminated, combined, or substituted by compiler 12 using the results of a preceding STM primitive 26, then compiler 12 generates STM code 16 for the second memory access to ensure that the second memory access correctly uses either the pointer to the original memory location 50 or the pointer to the shadow copy 56 that is produced by the first STM primitive 26. STM primitives 26 are configured to ensure that the address of any shadow copy 56 representing a memory location 50A will not change across a wide range of operations and thereby enable re-use of the shadow copy 56 by subsequent STM primitives 26.

STM library 42 includes the following STM primitives: OpenForRead, OpenForWrite, OpenForWriteAndRead, ReopenForReadAfterRead, and ReopenForReadAfterWrite. These STM primitives are configured to allow compiler 12 to eliminate redundant STM primitives or combine STM primitives.

Transactions 20B use the OpenForRead call to access a memory location 50 for reading. The OpenForRead call passes the base address of the memory location 50 as an argument to STM library 42 and causes the memory location 50 to be locked for the transaction 20B that invokes the call. In both the direct write and the buffered write modes of operation, STM library 42 logs the read access into log 52 using the base address and verifies that no other transaction 20B has write-locked the memory location 50. In the direct write mode of operation, STM library 42 returns the base address of the memory location 50 to the calling transaction 20B, and transaction 20B reads from the memory location 50 using the base address. In the buffered write mode of operation, STM library 42 returns a possible shadow copy pointer (i.e., either the base address of the memory location 50A or a pointer to a shadow copy 56 of the memory location 50B) to the calling transaction 20B, and transaction 20B reads at the appropriate offset (e.g., for a particular object field) from this returned memory location or shadow copy pointer.

Transactions 20B use the OpenForWrite call to access a memory location 50 for writing. The OpenForWrite call passes the base address of the memory location 50 as an argument to STM library 42 and causes the memory location 50 to be locked for the transaction 20B that invokes the call. In both the direct write and the buffered write modes of operation, STM library 42 logs the write access into log 52 using the base address and checks whether the memory location 50 is already write-locked. If it the memory location 50 write-locked by another transaction 20B, then some contention management action is taken to resolve the conflict. If the memory location 50 is write-locked by the current transaction 20B (e.g., by a nested transaction 20B), then STM library 42 returns the previously allocated shadow copy, as described in additional detail below. If the memory location 50 is not write-locked, STM library 42 causes the transaction 20B to own (i.e., write lock) the memory location 50. In the direct write mode of operation, STM library 42 returns the base address of the memory location 50 to the calling transaction 20B, and transaction 20B writes to the memory location 50 using the base address.

In the buffered write mode of operation, STM library 42 creates a shadow copy 56 of the memory location 50A and returns a pointer to a shadow copy 56 of the memory location 50 to the calling transaction 20B. Transaction 20B writes to the shadow copy 56 using the shadow copy pointer. STM library 42 copies the shadow copy 56 into the memory location 50A if the transaction 20B commits (e.g., by copying the bits or by switching a pointer) and discards the shadow copy 56 if the transaction 20B aborts.

STM library 42 is configured to ensure that the returned shadow copy pointer remains constant in a sequential transaction nest. Accordingly, STM library 42 causes the shadow copy 56 created in response to the first write access to a memory location 50A from a current transaction 20B to be reused for all subsequent read and write accesses from the current transaction 20B and any subsequent read and write accesses from any nested or outer transactions 20B of the current transaction 20B.

For the second and subsequent read and write accesses to a memory location 50A, STM library 42 returns the same pointer to the shadow copy 56. The transaction or transactions 20B with the subsequent accesses use the shadow copy pointer to access the shadow copy. For a subsequent write access performed by a transaction 20B nested within the transaction 20B that created the shadow copy 56, STM library 42 creates an undo copy of the shadow copy 56 or otherwise logs the changes to the shadow copy 56 to allow the original contents of the shadow copy 56 to be restored if the transaction 20B that issued the subsequent write access aborts. Otherwise, the writes remain in the shadow copy 56 when such a nested transaction 20B commits.

Figure 3:
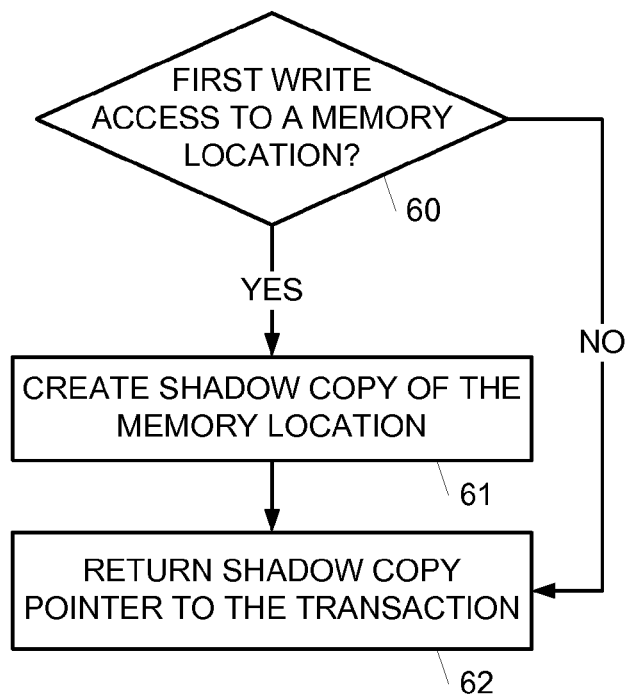
FIG. 3 is a flow chart illustrating an embodiment of a method for opening a memory access for writing and/or reading.

In the buffered write mode of operation, STM library 42 performs the method shown in FIG. 3. When STM library 42 receives an OpenForWrite call from a current transaction 20B, STM library 42 determines whether the OpenForWrite call corresponds to the first write access to a memory location 50A for the current transaction 20B and any nested or outer transaction or transactions 20B of the current transaction 20B as indicated in a block 60. If the OpenForWrite call corresponds to the first write access, then STM library 42 creates a shadow copy 56 of the memory location 50A as indicted in a block 61 and returns a pointer to the shadow copy 56 to the transaction 20B as indicated in a block 62. If the OpenForWrite call does not correspond to the first write access, then STM library 42 returns the pointer to the previously created shadow copy 56 to the current transaction 20B as indicated in block 62.

Because the shadow copy pointer remains stable, write accesses prior to and subsequent to procedure calls and/or across nested transactions 20B may be identified as redundant. Accordingly, the code sequence in Example 1 may be converted to the code sequence in Example 2 where a redundant OpenForWrite for the memory location O1 is omitted.

Example 1

O1.F = 1;
Foo( );
O1.F = 2;

Example 2

SC = OpenForWrite(O1)
*(SC + offset_of(F)) = 1;
Foo( );
*(SC + offset_of(F)) = 2;

Transactions 20B use the OpenForWriteAndRead call to access a memory location 50 for writing and reading. The OpenForWriteAndRead call passes the base address of the memory location 50 as an argument to STM library 42 and causes the memory location 50 to be locked for the transaction 20B that invokes the call. In both the direct write and the buffered write modes of operation, STM library 42 logs the write and read accesses into log 52 using the base address and, if the memory location 50 is not already write-locked, causes the transaction 20B to own (i.e., write lock) the memory location 50. In the direct write mode of operation, STM library 42 returns the base address of the memory location 50 to the calling transaction 20B, and transaction 20B writes and reads to the memory location 50 using the base address.

In the buffered write mode of operation, STM library 42 performs the functions described above for the OpenForWrite call when the OpenForWriteAndRead call is invoked such that the transaction 20B writes to the shadow copy 56 created by STM library 42. These functions include performing the method described above with reference to FIG. 3 to ensure that the shadow copy pointer remains the same throughout the transaction 20B. In addition, STM library 42 logs the read access into log 52 using the base address in response to the OpenForWriteAndRead call to allow the transaction 20B to read from the shadow copy 56.

With the OpenForWriteAndRead call, STM primitives for read and write accesses prior to and subsequent to procedure calls and/or across nested transactions 20B may be combined into a single STM primitive because the shadow copy pointer remains stable. Accordingly, the code sequence in Example 3 may be converted to the code sequence in Example 4 where an OpenForWrite and an OpenForRead for the memory location O1 are combined into a single OpenForWriteAndRead.

Example 3

O1.F1 = 1;
Foo( );
L = O1.F2;

Example 4

SC = OpenForWriteAndRead(O1)
*(SC + offset_of(F1)) = 1;
Foo( );
L = *(SC + offset_of(F2));

In Example 4, the memory location O1 may not actually be read from if the procedure call Foo( ) throws and the exception is caught and handled within the transaction 20B. The code of Example 4, however, operates correctly within STM system 40 even if the read does not occur.

As another example, the code sequence in Example 5 may be converted to the code sequence in Example 6 where an OpenForRead and an OpenForWrite for the memory location O1 are combined into a single OpenForWriteAndRead.

Example 5

L = O1.F1;
Foo( );
O1.F2 = L+1;

Example 6

SC = OpenForWriteAndRead(O1);
L = *(SC + offset_of(F1));
Foo( );
*(SC + offset_of(F2)) = L+1;

In this example, the write lock may be held for longer than originally intended (i.e., held across the procedure call Foo( );). As a result, the write lock may prevent other transactions that want to access the object to which O1 refers from making progress. Accordingly, it may be desirable in some instances to avoid combining an OpenForRead and an OpenForWrite into an OpenForWriteAndRead across procedure calls and/or nested transactions 20B where the calls and/or nested transactions 20B are invisible.

Where two or more accesses to memory location 50 follow one another without intervening writes or method calls, the results of an OpenForRead call of the first access may be reused for the subsequent accesses making subsequent OpenForRead calls redundant. Accordingly, the code sequence in Example 7 may be converted to the code sequence in Example 8 where a redundant OpenForRead for the memory location O1 is omitted.

Example 7

```
L1 = O1.F;
L2 = O1.F;
```

Example 8

```
SC1 = OpenForRead(O1);
L1 = *(SC1 + offset_of(F));
L2 = *(SC1 + offset_of(F));
```

Where two or more read accesses to memory location 50 follow one another with one or more intervening writes or method calls, intervening operations may open the memory location 50 for write. When an OpenForRead primitive is performed for the first read access, it may find that the memory location 50 has not been opened for write and return a direct pointer to the memory location 50. The intervening writes, or writes performed by intervening method calls, may create a shadow copy 56. In this case, the OpenForRead call for the second read access should, in the buffered write mode of operation, return a pointer to that shadow copy 56. Thus, in this case, the results of the first OpenForRead cannot be re-used. However, the information that the memory location 50 has already been opened for read at least once can be used to gain some efficiency.

In this situation, transactions 20B use the ReopenForReadAfterRead call to access a memory location 50 for reading after the memory location 50 has been opened for reading by a previous OpenForRead call. The ReopenForReadAfterRead call passes the base address of the memory location 50 and the result most recently obtained from an OpenForRead call or a ReopenForReadAfterRead call for the memory location 50 as arguments to STM library 42. In both the direct write and buffered write modes of operation, the memory location 50 was added to log 52 by the previous OpenForRead call. Accordingly, the ReopenForReadAfterRead call does not re-log the memory location 50.

In the direct write mode of operation, STM library 42 optionally verifies that no other transaction 20B has write-locked the memory reference 50 and returns the base address to the calling transaction 20B. The calling transaction 20B reads from the memory location 50 using the base address.

Figure 4:
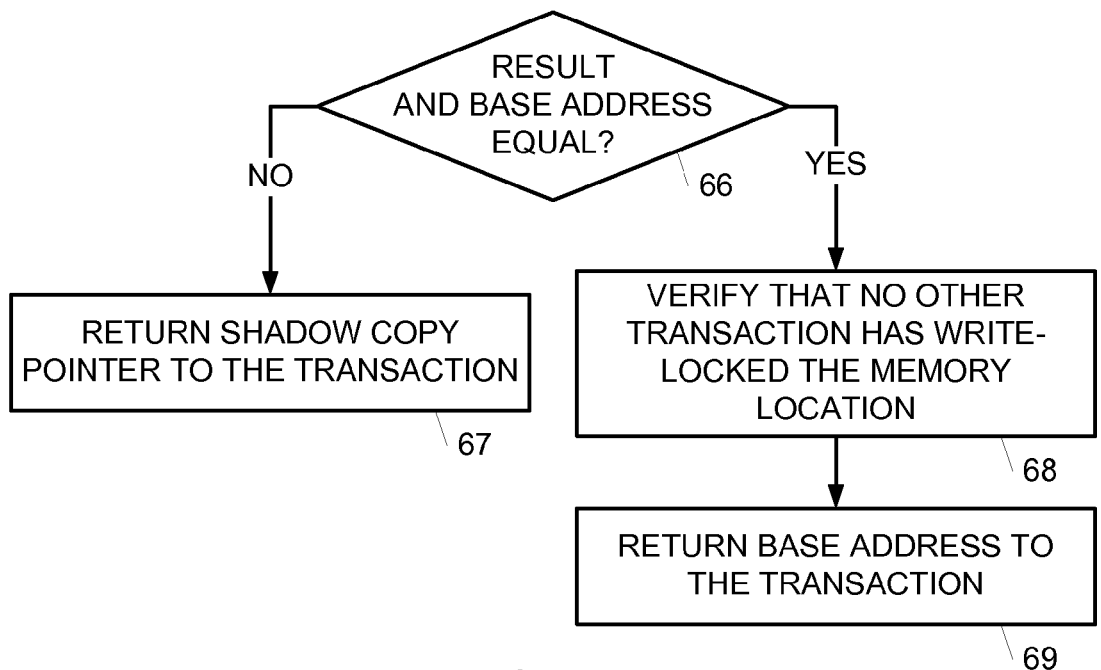
FIG. 4 is a flow chart illustrating an embodiment of a method for re-opening a memory access for reading.

In the buffered write mode of operation, STM library 42 uses the result most recently obtained from an OpenForRead call or a ReopenForReadAfterRead call as a filter as shown in the method FIG. 4.

When STM library 42 receives a ReopenForReadAfterRead call from a transaction 20B, STM library 42 determines whether the possible shadow copy pointer most recently obtained from an OpenForRead call or a ReopenForReadAfterRead call is equal to the base address of the memory location 50 as indicated in a block 66. If the possible shadow copy pointer is not equal to the base address, then the possible shadow copy pointer is a shadow copy pointer and STM library 42 returns the shadow copy pointer to the calling transaction 20B without further action as indicated in a block 67. The calling transaction 20B reads from the shadow copy 56 using the shadow copy pointer. If the possible shadow copy pointer is equal to the base address, then STM library 42 verifies that no other transaction 20B has write-locked the memory location 50 as indicated in a block 68 and returns the base address to the calling transaction 20B as indicated in a block 69. The calling transaction 20B reads from the memory location 50B using the base address.

By substituting the ReopenForReadAfterRead call for an OpenForRead call, successive STM primitives 26 for read accesses across procedure calls and/or nested transactions 20B may be optimized to reduce the STM overhead. The code sequence in Example 9 may be converted to the code sequence in Example 10 where the second OpenForRead for the memory location O1 may be replaced with a ReopenForReadAfterRead.

Example 9

```
L1 = O1.F;
Foo( );
L2 = O1.F;
```

Example 10

```
SC1 = OpenForRead(O1);
L1 = *(SC1 + offset_of(F));
Foo( );
SC1 = ReopenForReadAfterRead(O1, SC1);
L2 = *(SC2 + offset_of(F));
```

Transactions 20B use the ReopenForReadAfterWrite call to access a memory location 50 for reading after the memory location 50 has been opened for reading by a previous OpenForWrite call. The ReopenForReadAfterWrite call passes the base address of the memory location 50 as an argument to STM library 42. In both the direct write and buffered write modes of operation, STM library 42 adds the memory location 50 to log 52. The ReopenForReadAfterWrite call provides an alternative to the OpenForWriteAndRead call.

In one embodiment, STM library 42 implements the above STM primitives 26 as an application program interface (API). In other embodiments, STM library 42 implements the above STM primitives 26 using other suitable programming constructs.

Referring back to FIG. 1, compiler 12 is configured to identify when two or more memory accesses in a transaction 20A access the same memory location at runtime and either one access always follows the other access or that the one access follows the other access with great likelihood. In particular, compiler 12 identifies memory accesses where STM primitives 26 may be eliminated, combined, or substituted for lower overhead STM primitives 26.

Compiler 12 models the execution of transactions 20A code 14 using flow analysis module 32 to identify, in the context of individual memory transactions, whether memory locations are unopened, opened for read, opened for write, or opened for both. By doing so, compiler 12 determines when the use of STM primitives 26 may be optimized with respect to a set of collectively dominating STM primitives 26. Compiler 12 generates optimized STM code 16 to optimize the use of STM primitives 26.

Using STM library 42 as described above, compiler 12 recognizes that shadow copy pointers are stable regardless of any static or dynamic operations that occur, such as initiating nested transactions 20B and committing and/or aborting the nested transactions 20B. Because the shadow copy pointers are stable, compiler 12 may reuse the results of OpenForWrite, OpenForWriteAndRead, and (in some cases) OpenForRead calls to STM library 42.

Compiler 12 may reuse the results of an OpenForRead call as long as compiler 12 ensures that no static or dynamic intervening operation has potentially opened the memory location for write. Where OpenForRead calls follow each other, intervening operations may open the memory location for write, and compiler 12 cannot determine for the original write open state of the memory location, compiler 12 labels the second read access as tainted and substitutes a ReopenForReadAfterRead call for the second OpenForRead call. The ReopenForReadAfterRead call avoids re-logging the memory location and uses the previous results as a filter as described in additional detail above.

Figure 5:
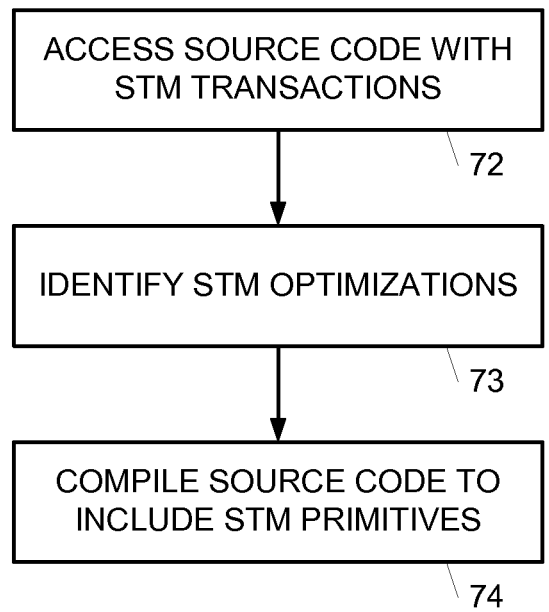
FIG. 5 is a flow chart illustrating an embodiment of a method for compiling source code.

FIG. 5 is a flow chart illustrating an embodiment of a method for compiling code 14 by compiler 12. Compiler 12 accesses code 14 with STM transactions 20A as indicated in a block 72. Compiler 12 identifies STM optimizations as indicated in a block 73 and compiles code 14 into optimized STM code 16 to include STM primitives 26 as indicated in a block 74. Additional details of identifying STM optimizations and compiling code 14 into optimized STM code 16 will now be described with reference to FIGS. 6 and 7.

Figure 6:
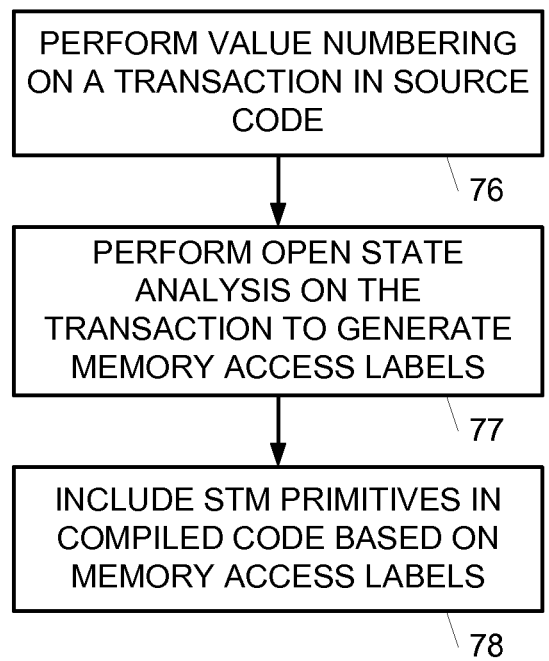
FIG. 6 is a flow chart illustrating an embodiment of a method for identifying software transaction memory optimizations.

Compiler 12 separately analyzes each lexically top-level transaction 20A in code 14 (i.e., the top-level syntactically within code 14 being compiled) individually to identify STM optimizations. If code 14 represents a transactional version of a method (i.e., a call in a lexical transaction should call a transactional version of the called method), compiler 12 analyzes the entire method. FIG. 6 is a flow chart illustrating an embodiment of a method for identifying STM optimizations. Compiler 12 performs the method of FIG. 6 for each lexically top-level transaction 20A in code 14 in one embodiment.

In FIG. 6, compiler 12 performs value numbering in a transaction 20A of code 14 as indicated in a block 76. Compiler 12 tracks the identity of memory locations in the transaction 20A by assigning value numbers to expressions in the transaction 20A that return memory locations. Compiler 12 assigns each expression a value number such that if two expressions have the same value number, then their values are equal. Expressions with distinct value numbers may be equal or different. Compiler 12 may take a simple, conservative approach and track value numbers only in local variables. Compiler 12 assigns distinct value numbers to all other expressions of reference type.

Compiler 12 tracks what reference value each local variable may contain. Control flow merges can make it unclear what reference value number a local variable contains, by merging states in which a local variable contains distinct value numbers. At such a merge, compiler 12 creates a new value number for the result of the merge. By doing so, compiler 12 avoids making incorrect inferences about reference identity in loops. Accordingly, a local variable used to iterate over the nodes in a linked list will have a different value number within the loop and after the loop—the latter will be a merge of the value within the loop body, and the previous value that the variable holds if the loop exits without executing. To make sure that value numbers are not used when they are not valid, compiler 12 performs a type of liveness pruning to remove information recorded about value numbers that are no longer in use at the end of basic blocks. Operationally, compiler 12 assigns the value numbers dynamically as part of the overall analysis.

Compiler 12 tracks accesses to memory locations such as object fields and array elements. Because local variables will not be opened for read or write, compiler 12 may omit the tracking of values for accesses to local variables. Compiler 12 also tracks accesses to static variables. In one embodiment, compiler 12 assigns each static block (each class has two such blocks, one for reference and one for non-reference values) a unique value number, as if it were an object. Compiler 12 treats an access to a static as if it were an access to a field of the corresponding static block. Although the two static blocks may be protected by a single write lock, compiler 12 treats them separately because open calls yield different shadow copies 56 in the buffered write mode of operation. Compiler 12 keeps static block value numbers always live but keeps object reference value numbers (i.e., all others) live at the end of a basic block only if they are the value of some local variable.

Compiler 12 performs an open state analysis on the transaction 20A to generate memory access labels as indicated in a block 77. Compiler 12 determines a set of the value numbers on which transaction 20A may perform open operations. The set is referred to as the opened references. At each program point, compiler 12 gives each of these opened reference value numbers one of the following open states:

NotOpened
Read(vn, {expr})
TaintedRead(vn, {expr})
Write(vn, {expr})
ReadWrite(vn, {expr})

The NotOpened state indicates that the memory location may not have been opened on some path leading to the current program point and is the default state for all value numbers. The Write state indicates that the memory location is opened for write. The Read state indicates that the memory location is at least opened for read—the memory location may also be opened for write. The ReadWrite state indicates that the memory location is opened both for read and write. The TaintedRead state indicates that the memory location has been opened for read and that the memory location may have also been opened for write subsequent to the open for read. Because the memory location may have also been opened for write, the possible shadow copy pointer returned by the original OpenForRead may no longer be correct—the original result may have been a pointer to the memory location and the new result should be a pointer to the newly-created shadow copy 56 (i.e., the possible shadow copy pointer is tainted). In this situation, the possible shadow copy pointer may not be reused, but a ReopenForReadAfterRead primitive may be substituted for an OpenForRead primitive.

The vn arguments in the above states indicate the local variable number of a variable reserved to contain the shadow copy pointer returned by a corresponding open primitive call.

Compiler 12 may ignore the vn argument in the direct write version of the analysis. In one embodiment, these variable numbers are virtual variable numbers and compiler 12 translates these virtual variable numbers into actual local variables prior to completing the STM optimization analysis. In other embodiments, the variable numbers may be the actual variable numbers. The {expr} argument is a set of first-open expressions (i.e., expressions at which the memory location may have been first opened on a program path leading to the current program point).

Compiler 12 also records variable renamings in a variable VarRename[vn]. VarRename[vn] is either nil or a virtual local variable number that compiler 12 uses instead of vn. Compiler 12 uses the variable renamings to ensure that open operations on different control flow paths that merge use the same local variable number to hold the shadow copy pointer returned by the open operations. VarRename[vn] is initially nil for all vn. It is an invariant of VarRename that if VarRename[vn0]=vn1 (!=nil), then VarRename[vn1]=nil. That is, if a variable is renamed, the variable to which it is renamed is not further renamed.

An example of variable renaming is shown in Example 11.

Example 11

```
if (P()) {
    o1.f1 = v1; // A
} else {
    o1.f2 = v2; // B
}
// C
o1.f3 = v3;
```

Compiler 12 seeks to eliminate the OpenForWrite(o1) that would normally precede the write after C, since one of A or B must precede it. In a buffered write system, the write access after C uses a shadow copy pointer from the previous OpenForWrite. When compiler 12 first encounters A and B, compiler 12 tentatively assigns local variable numbers to be used to hold the results of the associated OpenForWrite calls which are referred to as scA and scB, respectively. At the control flow merge at C, however, compiler 12 realizes that these open the same reference and that it would be more convenient if they stored their results in the same local variable. Compiler 12 arbitrarily chooses one of scA and scB to hold the result. Because the analysis is forward-only, compiler 12 expresses the choice by using VarRename to substitute scA for all uses of scB or to substitute scB for all uses of scA. Compiler 12 can now assume that the chosen virtual variable number holds the proper shadow copy pointer at C.

Compiler 12 uses the open states to label the memory accesses. The set of labels are as follows:
non-redundant-read(vn, valNum)
non-redundant-write(vn, valNum)
non-redundant-read-write(vn, valNum)
redundant(vn, valNum)
tainted-redundant(vn, valNum).

The non-redundant-read, non-redundant-write, and non-redundant-read-write labels indicate the mode in which the memory location should be opened during execution of optimized STM code 16. The vn argument indicates the virtual variable number that should hold the resulting shadow copy variable. The valNum argument indicates the value number for the memory location being opened for which the label is valid. The redundant label indicates that the memory access is redundant, and that a previous access has stored the relevant shadow copy pointer in the virtual local variable vn. Similarly, the tainted-redundant label indicates that the access is redundant but tainted by an intervening write or method call. Compiler 12 re-evaluates these labelings every time compiler 12 visits a memory access expression. Compiler 12 iteratively performs the analysis until a fixed point is reached at which the last labeling at each memory access will be the correct one.

Compiler 12 initializes the analysis state for the start of the first basic block of the outermost block so that all memory location value numbers are in the NotOpened state. Initially, no memory accesses have labels.

When compiler 12 encounters an entry into a nested transaction 20A, compiler 12 resets all open states to NotOpened. Compiler 12 does not, however, change open states in response to an exit from a nested transaction 20A.

In the following discussion, valNum refers to the value number of a memory location.

In response to a read operation (Read: expr), compiler 12 modifies the open state of the memory locations and labels as follows.

Let S=OpenState(valNum).
If S is NotOpened, then this is a first read of valNum. The new open state is Read(vn, {expr}), where vn is a newly-allocated virtual local variable number. If this access is already labeled non-redundant-read-write(vn, valNum), then it is left as is. Otherwise, it is labeled non-redundant-read(vn, valNum). No other labeling is affected. No other open state is affected.
If S=Read(vn, ExprSet), the open state of valNum is not changed. The read expression expr is labeled as redundant(vn, valNum). No other labeling or open state is affected.
If S=TaintedRead(vn, ExprSet), the open state of valNum is not changed. The read expression expr is labeled as tainted-redundant(vn, valNum). No other labeling or open state is affected.
If S=Write(vn, ExprSet), the open state of valNum is not changed. The read expression expr is labeled as redundant(vn). Each member of ExprSet is labeled non-redundant-read-write(vn, valNum).
If S=ReadWrite(vn, ExprSet), the open state of valNum is not changed. The read expression expr is labeled as redundant(vn, valNum).

In response to a write operation (Write: expr), compiler 12 modifies the open state of the memory locations and labels as follows.

Let S=OpenState(valNum).
If S is NotOpened, then this is a first write of valNum. The new open state is Write(vn, {expr}), where vn is a newly-allocated local variable number. If the access is currently labeled non-redundant-read-write(vn, valNum), then it is left as is. Otherwise it is labeled non-redundant-write(vn, valNum). No other labeling is affected. Other open states may be affected as described below with reference to tainting.
If S=Read(vn, ExprSet) or TaintedRead(vn, ExprSet), then compiler 12 tests whether the basic block containing expr post-dominates each of the basic blocks containing the members of ExprSet. A basic block B2 post-dominates B1 if every control flow path from B1 to an exit point of the method, ignoring exceptions thrown and not caught in the current method, must go through B2. A basic block post-dominates itself. The post-dominates relation on basic blocks, as well as its obviously-related converse the dominates relation, are computed by a separate analysis on the basic block graph. If the basic block containing expr post-dominates each of the basic blocks containing the members of ExprSet, then the open state of valNum becomes ReadWrite(vn, ExprSet), the write expression expr is labeled as redundant(vn, valNum), and each member of ExprSet whose current label is non-redundant-read(vn, valNum) is labeled as non-redundant-read-write(vn, valNum). If a first-open expression is labeled non-redundant-write(vn, valNum), or non-redundant-read-write(vn, valNum), compiler 12 does not change the label. As an invariant of the algorithm, first-open-expressions are always non-redundant. If the basic block containing expr does not post-dominate the blocks containing all members of ExprSet, then the write expression expr is labeled as a non-redundant-write(vn, valNum), where vn is a newly-allocated virtual local variable number. Other open states may be affected as described below with reference to tainting.

If S=Write(vn, ExprSet), the open state of valNum does not change. The write expression expr is labeled as redundant(vn, valNum).

In all cases, compiler 12 additionally examines the open states of all opened reference value numbers valNum2 different from valNum. If the OpenState(valNum2) is Read(vn2, ExprSet), and compiler 12 cannot prove that valNum2 denotes a distinct memory location from valNum, then this write expression may create a new shadow copy pointer for valNum2. Therefore, compiler 12 changes OpenState(valNum2) to TaintedRead(vn2, ExprSet). Compiler 12 may be able to prove that valNum2 denotes a distinct memory location from valNum, for example, by tracking static types. If the type of one memory location is A and the type of another memory location is B and neither A nor B is a supertype of the other, then the memory locations are distinct references.

Calls also have an effect on open states. After a call, compiler 12 assigns every memory location whose open state had been Read(vn, ExprSet) to the open state TaintedRead(vn, ExprSet). Calls have no effect on memory locations whose open state had been Write or ReadWrite.

In the above embodiment, a write following a first-open read promotes the read to write-and-read only if the write post-dominates the read, while a read following a write promotes the write to write-and-read without the post-dominates check. First, note that this is purely a heuristic decision, in that all decisions are still correct. Opening an object for write may be considerably more expensive than opening an object for read. Accordingly, promoting an access to write and read therefore adds a small incremental cost to opening for write, but a large incremental cost to opening for read. Further, the consequences of performing this promotion in error, when the second access might not actually follow the first, are different. Obtaining an unnecessary write lock increases the conflict footprint of a transaction, and may cause it, or another transaction, to abort, or at least be delayed, unnecessarily. In contrast, adding an unnecessary object to a transaction's read set matters only if the transaction later does a retry operation, in which case it increases the probability of being woken spuriously before the retry condition is actually satisfied. Thus, the cost and consequences of error may be much lower for promoting a write access to open for write and read, so compiler 12 does that even if the subsequent read may not necessarily follow (i.e., does not post-dominate) the write. Compiler 12 only promotes a read to open for write and read when the subsequent write does necessarily follow (i.e., post-dominates) the read.

Compiler 12 performs the merge operation as follows.

For all x: merge(NotOpened, x)=merge(x, NotOpened)= NotOpened.

For other cases, the following convenience functions are defined.

```
Renaming(VarRenames, vn) = if (VarRenames[vn] != nil)
                              then VarRenames[vn]
                              else vn)
Rename(VarRenames, vn2, vn1) =
   [ res = VarRenames;
      for each i such that VarRenames[i] =
      Renaming(VarRenames, vn2):
         res[i] = Renaming(VarRenames, vn1);
      res ]
```

In the cases below, compiler 12 arbitrarily picks one of the input value numbers as the result and rename the other. Without loss of generality:

∀x, y: merge(x, y)=merge(y, x)

merge(Read(vn1, ExprSet1), Read(vn2, ExprSet2))=Read (Renaming(VarRenames, vn1), ExprSet1∪ExprSet2); additionally, let VarRenames=Rename(VarRenames, vn2, vn1).

merge(Read(vn1, ExprSet1), TaintedRead(vn2, ExprSet2))=TaintedRead(Renaming(VarRenames, vn1), ExprSet1∪ExprSet2); additionally, let VarRenames=Rename(VarRenames, vn2, vn1).

merge(Read(vn1, ExprSet1), Write(vn2, ExprSet2))= Read(Renaming(VarRenames, vn1), ExprSet1∪ExprSet2); additionally, let VarRenames=Rename(VarRenames, vn2, vn1).

merge(Read(vn1, ExprSet1), ReadWrite(vn2, ExprSet2))=Read(Renaming(VarRenames, vn1), ExprSet1∪ExprSet2); additionally, let VarRenames=Rename(VarRenames, vn2, vn1).

merge(TaintedRead(vn1, ExprSet1), TaintedRead(vn2, ExprSet2))=TaintedRead(Renaming(VarRenames, vn1), ExprSet1∪ExprSet2); additionally, let VarRenames=Rename(VarRenames, vn2, vn1).

merge(TaintedRead(vn1, ExprSet1), Write(vn2, ExprSet2))=TaintedRead(Renaming(VarRenames, vn1), ExprSet1∪ExprSet2); additionally, let VarRenames=Rename(VarRenames, vn2, vn1).

merge(TaintedRead(vn1, ExprSet1), ReadWrite(vn2, ExprSet2))=TaintedRead(Renaming(VarRenames, vn1), ExprSet1∪ExprSet2); additionally, let VarRenames=Rename(VarRenames, vn2, vn1).

merge(Write(vn1, ExprSet1), Write(vn2, ExprSet2))= Write(Renaming(VarRenames, vn1), ExprSet1∪ExprSet2); additionally, let VarRenames=Rename(VarRenames, vn2, vn1).

merge(Write(vn1, ExprSet1), ReadWrite(vn2, ExprSet2))=Write(Renaming(VarRenames, vn1), ExprSet1∪ExprSet2); additionally, let VarRenames=Rename(VarRenames, vn2, vn1).

merge(ReadWrite(vn1, ExprSet1), ReadWrite(vn2, ExprSet2))=ReadWrite(Renaming(VarRenames, vn1), ExprSet1∪ExprSet2); additionally, let VarRenames=Rename(VarRenames, vn2, vn1).

As previously noted, compiler 12 uses the same constant vn for purposes of these rules in the direct write version of the system.

With these rules, compiler 12 iterates the analysis until a fixed point is reached.

Compiler 12 labels all accesses as described below. Compiler 12 uses these labels to generate optimized STM code 16. The function VirtualToRealLocal(vn) returns the actual local variable number corresponding to one of the virtual local variable numbers used in the analysis.

non-redundant-read(vn, valNum).
Let vn2=Renaming(VarRenames, vn). Perform a normal OpenForRead, assigning the result to local variable VirtualToRealLocal (vn2).

non-redundant-write(vn, valNum).
Let vn2=Renaming(VarRenames, vn). Perform an OpenForWrite, assigning the result to local variable VirtualToRealLocal (vn2).

non-redundant-read-write(vn, valNum).
Let vn2=Renaming(VarRenames, vn). Perform an OpenForWriteAndRead, even if the access is a read, assigning the result to local variable VirtualToRealLocal (vn2).

tainted-redundant(vn, valNum).
Let vn2=VirtualToRealLocal(Renaming(VarRenames, vn)). If o is the memory location being accessed, perform ReopenForReadAfterRead(o, vn2), assigning the result to local variable vn2.

ReopenForReadAfterRead takes advantage of a preceding "tainted" OpenForRead result. This result is "tainted" because it might have been a pointer to the original memory location, which might have later been opened for write. But if the memory location had been opened for write before the preceding read, then vn2 will already contain a shadow copy pointer. In neither case, however, is any logging done—the reference has definitely been opened once at least for reading.

redundant(vn, valNum)
Let vn2=VirtualToRealLocal (Renaming(VarRenames, vn)). Do not generate an open call; use local variable vn2 as the shadow copy pointer that would have been returned by the open call.

Referring back to FIG. 6, compiler 12 includes STM primitives in the transaction 20B that corresponds to the transaction 20A in optimized STM code 16 based on the memory access labels as indicated in a block 78. Compiler 12 includes the STM primitives for memory accesses that are labeled non-redundant as described above. Compiler 12 may cause the previously chosen local variable number to be used to hold the result of the open call in a buffered write mode of operation. For memory accesses that are labeled redundant (i.e., redundant(v, valNum)), compiler 12 omits the open call and substitutes v for the memory location in the memory access expression.

Figure 7:
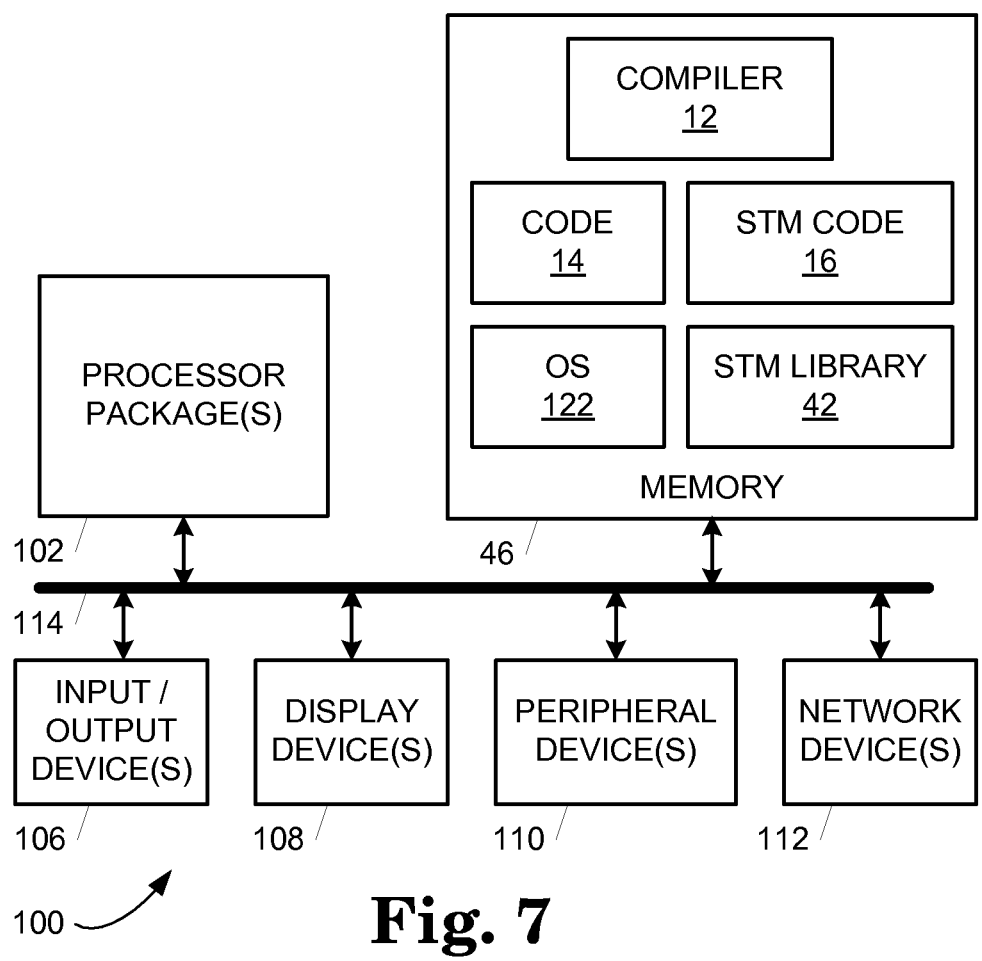
FIG. 7 is a block diagram illustrating an embodiment of a computer system configured to execute an STM compiler and/or STM library.

FIG. 7 is a block diagram illustrating an embodiment of a computer system configured to execute an STM compiler 12 and/or STM library 42.

Computer system 100 includes one or more processor packages 102, memory system 46 (also shown in FIGS. 2A-2C), zero or more input/output devices 106, zero or more display devices 108, zero or more peripheral devices 110, and zero or more network devices 112. Processor packages 102, memory system 46, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 46, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 46. The instructions may include a basic input output system (BIOS) or firmware (not shown), OS 122, STM library 42, code 12, compiler 14, and optimized code 16. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. In one embodiment, OS 122 is the Windows operating system. In other embodiments, OS 122 is another operating system suitable for use with computer system 100.

As noted above, memory system 46 includes any suitable type, number, and configuration of volatile or non-volatile storage devices configured to store instructions and data. The storage devices of memory system 46 represent computer readable storage media that store computer-executable instructions including code 12, compiler 14, optimized code 16, OS 122, and STM library 42.

Memory system 46 stores instructions and data received from processor packages 102, input/output devices 106, display devices 108, peripheral devices 110, and network devices 112. Memory system 46 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of compiling a program, the method comprising:
performing a program flow analysis on a software transactional memory (STM) transaction to be modified into a compiled STM transaction including STM primitives that call functions in a STM library, the program flow analysis tracks a possible shadow copy pointer for first and second memory accesses to a memory location in the STM transaction, the possible shadow copy pointer is either a base address of the memory location or a shadow copy pointer to a shadow copy of the memory location based on the STM transaction, the functions of the STM library return results to the compiled STM transaction including in a direct write mode of operation returning the base address and in a buffered write mode of operation returning the possible shadow copy pointer; and
identifying an STM optimization for the second memory access in the compiled STM transaction using the program flow analysis.

2. The method of claim 1 further comprising:
including a first open call for the first memory access that is configured to return a result in a compiled version of the STM transaction; and
reusing the result for the second memory access.

3. The method of claim 1 further comprising:
including a first open call for the first memory access in a compiled version of the STM transaction; and
omitting a second open call for the second memory access in the compiled version of the STM transaction.

4. The method of claim 3 wherein the first and the second memory accesses are write accesses.

5. The method of claim 3 wherein the first open call is configured to open the memory location for writing and reading.

6. The method of claim 5 wherein the first memory access is a write access and wherein the second memory access is a read access.

7. The method of claim 5 wherein the first memory access is a read access and wherein the second memory access is a write access.

8. The method of claim 1 further comprising:
including a first open call for the first memory access that is configured to open the memory location for reading in a compiled version of the STM transaction; and
including a second open call for the second memory access that is configured to reopen the memory location for reading in the compiled version of the STM transaction.

9. The method of claim 8 wherein the first open call is configured to cause the first memory access to be logged, and wherein the second open call is configured to cause the second memory access not to be logged.

10. The method of claim 8 wherein the second open call includes a result returned in response to the first open call as an argument.

11. A computer readable storage medium storing computer-executable instructions that, when executed by a computer system, perform a method comprising:
tracking first and second memory accesses to a memory location in an STM transaction in source code to be modified into a compiled STM transaction in compiled code including STM primitives that call functions in a STM library;
identifying first and second open states of the first and the second memory accesses, respectively, including identifying first and second possible shadow copy pointers for the first and the second memory accesses, respectively, each of the possible shadow copy pointers is either certain instances a base address of the memory location or a shadow copy pointer to a shadow copy of the memory location based on the STM transaction, the functions of the STM library return results to the compiled STM transaction including in a direct write mode of operation returning the base address and in a buffered write mode of operation returning the respective one of the possible shadow copy pointers; and
determining that the second memory access is configurable to reuse the first possible shadow copy pointer using the first and the second open states in the compiled STM transaction.

12. The computer readable storage medium of claim 11 wherein the first and the second possible shadow copy pointers are one of a base address and a shadow copy pointer.

13. The computer readable storage medium of claim 11, the method further comprising:
tracking the first and the second memory accesses by performing a value numbering analysis.

14. The computer readable storage medium of claim 11, the method further comprising:
assigning first and second labels to the first and the second memory accesses, respectively, that indicate whether first and the second memory accesses, respectively, are redundant based on the first and the second open states.

15. The computer readable storage medium of claim 14, the method further comprising:
compiling the transaction in the source code using the first and the second labels.

16. A method of compiling a program, the method comprising:
including a first open call for a first memory access to a memory location that is configured to return a possible shadow copy pointer in a compiled version of an STM transaction including STM primitives that call functions in a STM library, the possible shadow copy pointer is either a base address of the memory location or a shadow copy pointer to a shadow copy of the memory location based on the STM transaction, the functions of the STM library return results to the compiled version of the STM transaction including in a direct write mode of operation returning the base address and in a buffered write mode of operation returning the possible shadow copy pointer; and
configuring a second memory access in the compiled version of the STM transaction to reuse the possible shadow copy pointer based on a result of a program flow analysis that tracks the possible shadow copy pointer.

17. The method of claim 16 wherein the possible shadow copy pointer is one of a base address and a shadow copy pointer.

18. The method of claim 16 further comprising:
omitting a second open call for the second memory access in the compiled version of the STM transaction;
wherein the first memory access is a first write access, and wherein the second memory access is one of a read access and a second write access.

19. The method of claim 16 wherein the first open call is configured to open the memory location for reading; and further comprising:
including a second open call for the second memory access that is configured to reopen the memory location for reading in the compiled version of the STM transaction.

20. The method of claim 19 wherein the second open call includes the possible shadow copy pointer as an argument.

\* \* \* \* \*